(12) United States Patent
Jamal et al.

(10) Patent No.: US 11,254,028 B2
(45) Date of Patent: Feb. 22, 2022

(54) SYSTEMS AND PROCESSES FOR ACCELERATED CARBONATION CURING OF PRE-CAST CEMENTITIOUS STRUCTURES

(71) Applicant: Saudi Arabian Oil Company, Dhahran (SA)

(72) Inventors: Aqil Jamal, Dhahran (SA); Bandar A. Fadhel, Dhahran (SA); Issam T. Amr, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 340 days.

(21) Appl. No.: 16/416,384

(22) Filed: May 20, 2019

(65) Prior Publication Data

US 2020/0368937 A1 Nov. 26, 2020

(51) Int. Cl.
*B28B 11/24* (2006.01)
*C04B 40/02* (2006.01)

(52) U.S. Cl.
CPC ............ *B28B 11/24* (2013.01); *C04B 40/024* (2013.01); *C04B 40/0231* (2013.01)

(58) Field of Classification Search
CPC ...... B28B 11/24; B28B 11/245; C04B 40/024
See application file for complete search history.

(56) References Cited

U.S. PATENT DOCUMENTS

| 3,238,279 | A | * | 3/1966 | Tarlton | ................. C04B 40/0263 264/82 |
| 3,393,261 | A | | 7/1968 | Herzig et al. | |
| 3,957,937 | A | | 5/1976 | Lovell | |
| 3,982,890 | A | * | 9/1976 | Lovell | ................... B28B 11/245 432/138 |

(Continued)

FOREIGN PATENT DOCUMENTS

| CH | 644828 A5 | 8/1984 |
| FR | 2503135 A1 | 10/1982 |

(Continued)

OTHER PUBLICATIONS

International Search Report and Written Opinion dated Feb. 14, 2020 pertaining to International application No. PCT/US2019/057152 filed Oct. 21, 2019, 21 pgs.

(Continued)

*Primary Examiner* — Jacob T Minskey
*Assistant Examiner* — Virak Nguon
(74) *Attorney, Agent, or Firm* — Dinsmore & Shohl, LLP

(57) ABSTRACT

Systems for accelerated carbonation curing of a pre-cast cementitious structure may include an ejector and a curing chamber downstream of the ejector. The ejector may be operable to combine a lesser-pressure carbon dioxide containing stream from a carbon dioxide source with a greater-pressure steam to produce a mixed stream including at least steam and carbon dioxide. The mixed stream may have a pressure greater than the pressure of the lesser-pressure carbon dioxide containing stream. The curing chamber may (Continued)

be operable to receive the mixed stream from the ejector and contact the mixed stream with the pre-cast cementitious structure to cure the pre-cast cementitious structure. Processes for accelerated carbonation curing of pre-cast cementitious structures using the systems are also disclosed.

20 Claims, 2 Drawing Sheets

(56) References Cited

U.S. PATENT DOCUMENTS

| | | | |
|---|---|---|---|
| 4,135,940 | A | 1/1979 | Peltier |
| 4,362,679 | A | 12/1982 | Malinowski |
| 4,772,439 | A | 9/1988 | Trevino-Gonzalez |
| 4,917,587 | A | 4/1990 | Alpar et al. |
| 5,257,464 | A | 11/1993 | Trevino-Gonzales |
| 5,624,493 | A | 4/1997 | Wagh et al. |
| 5,935,317 | A | 8/1999 | Soroushian et al. |
| 6,669,843 | B2 | 12/2003 | Arnaud |
| 7,390,444 | B2 * | 6/2008 | Ramme ............ C04B 28/021 264/37.14 |
| 8,043,426 | B2 | 10/2011 | Mohamed et al. |
| 8,603,222 | B2 | 12/2013 | Sceats et al. |
| 8,623,134 | B2 | 1/2014 | Nguy?n et al. |
| 8,709,151 | B2 | 4/2014 | Quaghebeur et al. |
| 8,845,940 | B2 | 9/2014 | Niven et al. |
| 9,108,883 | B2 | 8/2015 | Forgeron et al. |
| 9,611,762 | B2 | 4/2017 | J?sson et al. |
| 10,010,826 | B2 | 7/2018 | Okumura et al. |
| 10,093,577 | B2 | 10/2018 | Hitomi et al. |
| 10,233,127 | B2 * | 3/2019 | Atakan ............... C04B 7/243 |
| 2011/0217218 | A1 | 9/2011 | Gupta et al. |
| 2014/0322083 | A1 * | 10/2014 | Kuppler ............... F27B 5/04 422/109 |
| 2015/0225295 | A1 | 8/2015 | McCandlish et al. |
| 2017/0226021 | A1 | 8/2017 | Sant et al. |
| 2017/0241871 | A1 | 8/2017 | Mayelle et al. |
| 2018/0273430 | A1 | 9/2018 | Tas et al. |
| 2019/0047175 | A1 | 2/2019 | Hargest et al. |

FOREIGN PATENT DOCUMENTS

| | | | | |
|---|---|---|---|---|
| JP | 02137782 | A | 5/1990 | |
| JP | 2002292612 | A | 10/2002 | |
| JP | 2002293601 | A | 10/2002 | |
| JP | 2012126623 | A * | 7/2012 | ............ B01D 53/62 |
| WO | 8500587 | A1 | 2/1985 | |
| WO | 9011258 | A1 | 10/1990 | |
| WO | 2012081486 | A1 | 6/2012 | |
| WO | 2014160168 | A1 | 10/2014 | |
| WO | 2018081310 | A1 | 5/2018 | |

OTHER PUBLICATIONS

Ekolu et al., "A Review on effects of curing, sheltering, and CO2 concentration upon natural carbonation of concrete", Construction and Building Materials, vol. 127, pp. 306-320, 2016.

El-Hasan et al., "Effect of Initial Curing on Carbonation of Lightweight Concrete Masonry Units", ACI Materials Journal, vol. 110, Issue 4, pp. 441-450, Jul.-Aug. 2013.

Fernandez Bertos et al., "A review of accelerated carbonation technology in the treatment of cement-based materials and sequestration of CO2", Journal of Hazardous Materials, vol. 112, Issue 3, pp. 193-205, Aug. 30, 2004.

Mahoutian et al., "Pilot production of steel slag masonry blocks", Canadian Journal of Civil Engineering, vol. 45, Issue 7, pp. 537-546, Jul. 2018.

Morshed, et al., "Optimized process window for fresh concrete carbonation curing", Canadian Journal of Civil Engineering, vol. 41, Issue 11, pp. 986-994, Nov. 2014.

Rostami et al., "Carbonation Curing versus Steam Curing for Precast Concrete Production", Journal of Materials in Civil Engineering, vol. 24, Issue 9, pp. 1221-1229, Sep. 2012.

Salman et al., "Cementitious binders from activated stainless steel refining slag and the effect of alkali solutions", Journal of Hazaradous Materials, vol. 286, pp. 211-219, Apr. 9, 2015.

Salman et al., "Alkali Activation of AOD Stainless Steel Slag Under Steam Curing Conditions", Journal of the American Ceramic Society, vol. 98, Issue 10, pp. 3062-3074, Oct. 2015.

* cited by examiner

SYSTEMS AND PROCESSES FOR ACCELERATED CARBONATION CURING OF PRE-CAST CEMENTITIOUS STRUCTURES

TECHNICAL FIELD

The present specification generally relates to systems and processes for curing pre-cast cementitious structures and, in particular, systems and processes that can enhance accelerated carbonation curing for pre-cast cementitious structures.

BACKGROUND

Cementitious products, such as concrete blocks, pre-formed building walls, cement barricades, or other cementitious products, may be produced by forming pre-cast cementitious structures followed by curing the pre-cast cementitious structures. Accelerated carbonation curing (ACC) may be used to increase the productivity of manufacturing such cementitious products by reducing the time required for curing the pre-cast cementitious structures. In particular, accelerated carbonation curing may be capable of providing stable cementitious products within hours compared to cure times measured in days for conventional curing methods. Accelerated carbonation curing involves placing the pre-cast cementitious structures in an enclosure or chamber, often referred to as a curing chamber, and contacting the cementitious structures with a gas stream containing carbon dioxide ($CO_2$) or a mixed stream that includes carbon dioxide and steam.

Gas streams containing carbon dioxide can be obtained from a variety of sources. However, many sources of gas streams containing carbon dioxide produce the gas stream at atmospheric pressure while steam is often produced as greater-pressure steam. Because of this, lesser-pressure gas streams containing carbon dioxide often require compression to a pressure greater than atmospheric pressure before being combined with the greater-pressure steam. Compression of the gas streams containing carbon dioxide is often accomplished by compressors or pumps included in the accelerated carbonation curing system. However, these pumps and compressors are costly, require large amounts of energy to operate, and introduce a number of moving parts to the system that may require maintenance or replacement.

SUMMARY

Accordingly, ongoing needs exist for improved systems and processes for accelerated carbonation curing. Specifically, ongoing needs exist for systems and processes for combining lesser-pressure carbon dioxide containing gases with greater-pressure steam without first compressing the lesser-pressure carbon dioxide containing stream prior to combination with the greater-pressure steam. The systems and processes of the present disclosure include an ejector, such as a vacuum ejector, that is operable to combine greater-pressure steam with a lesser-pressure carbon dioxide containing stream without the need to first compress the lesser-pressure carbon dioxide containing stream. In particular, the ejector relies on the Venturi effect in which a vacuum is created by the passing of the greater-pressure steam through the ejector. The vacuum produced by the greater-pressure steam passing through the ejector may be sufficient to draw the lesser-pressure carbon dioxide containing stream into the greater-pressure steam. This may produce a mixed stream comprising carbon dioxide and steam and having a pressure greater than the pressure of the lesser-pressure carbon dioxide containing gas without additional compression or components that include moving parts.

According to one or more aspects of the present disclosure, a system for accelerated carbonation curing of a pre-cast cementitious structure may include an ejector and a curing chamber downstream of the ejector. The ejector may be operable to combine a lesser-pressure carbon dioxide containing stream from a carbon dioxide source with greater-pressure steam to produce a mixed stream including at least steam and carbon dioxide. The mixed stream may have a pressure greater than the pressure of the lesser-pressure carbon dioxide containing stream. The curing chamber may be operable to receive the mixed stream from the ejector and contact the mixed stream with the pre-cast cementitious structure during curing of the pre-cast cementitious structure.

According to one or more aspects of the present disclosure, a system for accelerated carbonation curing of a pre-cast cementitious structure may include a carbon dioxide source, a steam system, an ejector, and a curing chamber downstream of the ejector. The carbon dioxide source may be operable to produce a lesser-pressure carbon dioxide containing stream. The steam system may be operable to produce greater-pressure steam. The ejector may be operable to combine the greater-pressure steam with the lesser-pressure carbon dioxide containing stream to produce a mixed stream including at least steam and carbon dioxide. The mixed stream may have a pressure greater than a pressure of the lesser-pressure carbon dioxide containing stream. The curing chamber may be operable to receive the mixed stream from the ejector and contact the mixed stream with the pre-cast cementitious structure during curing of the pre-cast cementitious structure.

According to one or more aspects of the present disclosure, a process for accelerated carbonation curing of a pre-cast cementitious structure may include producing greater-pressure steam and passing the greater-pressure steam through an ejector having a vacuum chamber in fluid communication with a carbon dioxide source to receive a lesser-pressure carbon dioxide containing stream. The lesser-pressure carbon dioxide containing stream may have a pressure less than a pressure of the greater-pressure steam. Passing the greater-pressure steam through the ejector combines the lesser-pressure carbon dioxide containing stream with the greater-pressure steam to produce a mixed stream including at least steam and carbon dioxide. The mixed stream may have a pressure greater than the pressure of the lesser-pressure carbon dioxide containing stream. The process may also include contacting the mixed stream with a pre-cast cementitious structure to conduct the accelerated carbonation curing of the pre-cast cementitious structure.

Additional features and advantages of the present disclosure will be set forth in the detailed description that follows, and in part will be readily apparent to those skilled in the art from that description or recognized by practicing the described subject matter, including the detailed description that follows, the claims, as well as the appended drawings.

BRIEF DESCRIPTION OF THE DRAWINGS

The following detailed description of specific aspects of the present disclosure can be best understood when read in conjunction with the following drawings, in which like structure is indicated with like reference numerals and in which.

Figure 1:
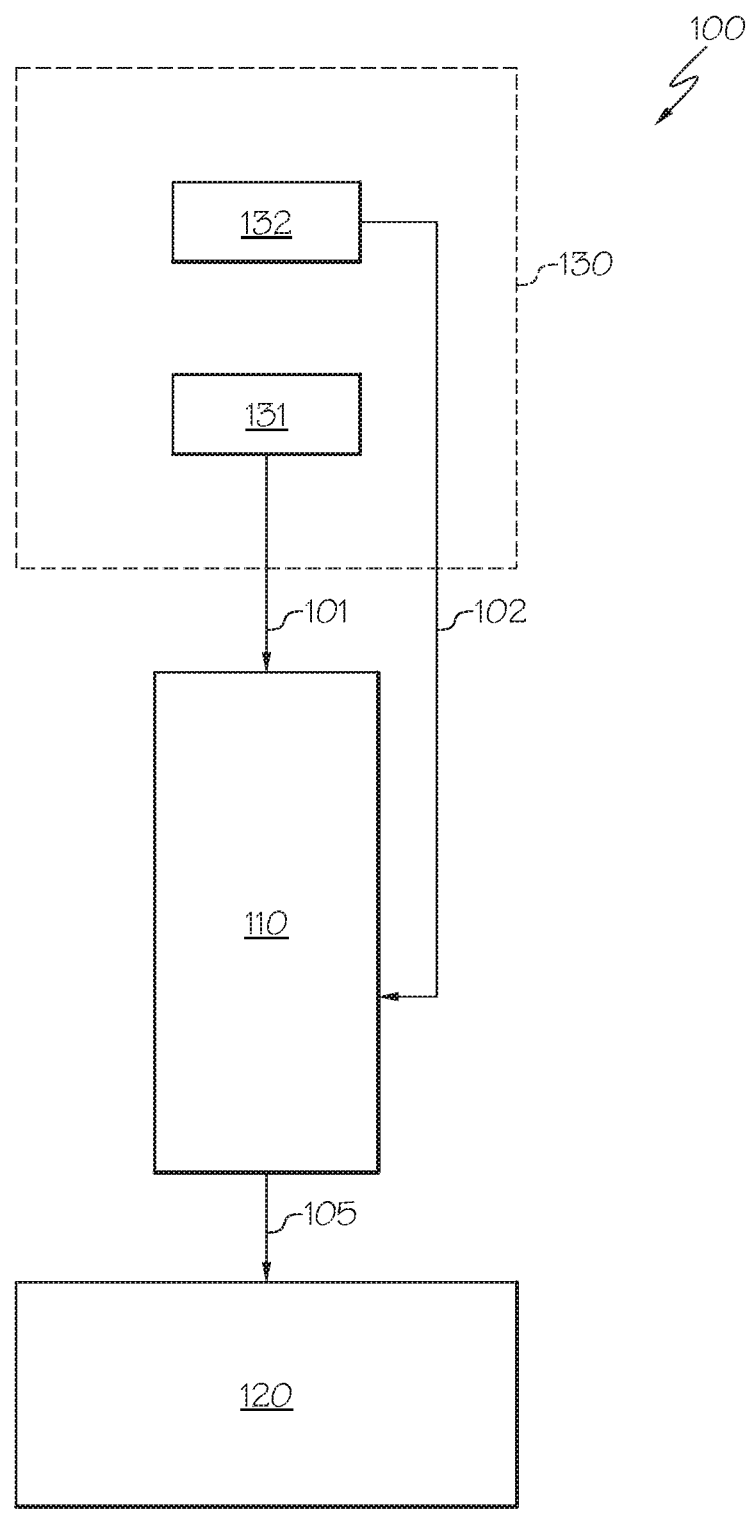
FIG. 1 schematically depicts a generalized diagram of a system for accelerated carbonation curing of a pre-cast cementitious structure, according to one or more embodiments described in this disclosure.

For purposes of describing the simplified schematic illustrations and descriptions in FIG. 1, the numerous valves, temperature sensors, flow meters, pressure regulators, electronic controllers, pumps, and the like that may be employed and well known to those of ordinary skill in the art of certain chemical processing operations are not included. Further, accompanying components that are often included in typical chemical processing operations, such as valves, pipes, pumps, agitators, heat exchangers, instrumentation, internal vessel structures, or other subsystems may not be depicted. Though not depicted, it should be understood that these components are within the spirit and scope of the present embodiments disclosed. However, operational components, such as those described in the present disclosure, may be added to the embodiments described in this disclosure.

Arrows in the drawings refer to process streams. However, the arrows may equivalently refer to transfer lines which may serve to transfer process streams between two or more system components. Additionally, arrows that connect to system components may define inlets or outlets in each given system component. The arrow direction corresponds generally with the major direction of movement of the materials of the stream contained within the physical transfer line signified by the arrow. Furthermore, arrows which do not connect two or more system components may signify a product stream which exits the depicted system or a system inlet stream which enters the depicted system.

Additionally, arrows in the drawings may schematically depict process steps of transporting a stream or composition from one system component to another system component. For example, an arrow from one system component pointing to another system component may represent "passing" a stream or composition to another system component, which may include the contents of a process stream "exiting" or being "removed" from one system component and "introducing" the contents of that product stream to another system component.

Reference will now be made in greater detail to various aspects of the present disclosure, some aspects of which are illustrated in the accompanying drawings.

DETAILED DESCRIPTION

The present disclosure is directed to systems and processes for accelerated carbonation curing of pre-cast cementitious structures. The systems and process for accelerated carbonation curing may include an ejector and a curing chamber downstream of the ejector. The system may also include a steam system operable to produce greater-pressure steam and a carbon dioxide source operable to produce a gas stream comprising carbon dioxide. The ejector may be operable to combine a lesser-pressure carbon dioxide containing stream from a carbon dioxide source with a greater-pressure steam to produce a mixed stream including at least steam and carbon dioxide. The mixed stream may have a pressure greater than the pressure of the lesser-pressure carbon dioxide containing stream. The systems and processes for accelerated carbonation curing may further include a curing chamber downstream of the ejector. The curing chamber may be operable to receive the mixed stream from the ejector and contact the mixed stream with the pre-cast cementitious structure during curing of the pre-cast cementitious structure.

The systems and processes of the present disclosure enable accelerated carbonation curing of pre-cast cementitious structures without the need to compress a carbon dioxide containing stream with a compressor or pump to increase the pressure of the carbon dioxide containing stream prior to curing. Combining the lesser pressure carbon dioxide containing stream with the greater-pressure steam using an ejector may eliminate the need for pumps and compressors that are costly, require large amounts of energy to operate, and introduce a number of moving parts to the system that may require maintenance or replacement. The systems and processes of the present disclosure may increase the efficiency of accelerated carbonation curing processes.

The term "or", as used in the present disclosure, is inclusive; more specifically, the phrase "A or B" means "A, B, or both A and B." Exclusive "or" is designated in the present disclosure by terms such as "either A or B" and "one of A or B," for example.

The indefinite articles "a" and "an" are employed to describe elements and components of the present disclosure. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used in the present disclosure, also signifies that the modified noun may be singular or plural, again unless otherwise stated in specific instances.

As used in the present disclosure, the terms "upstream" and "downstream" refer to the positioning of units of operation relative to the direction of flow of the process streams. For example, a first process unit may be considered "upstream" of a second process unit if process streams flowing through the system encounter the first process unit before encountering the second process unit. Likewise, the second process unit is considered "downstream" of the first process unit if the process streams flowing through the system encounter the first process unit before encountering the second process unit.

Referring now to FIG. 1, a system 100 for accelerated carbonation curing of a pre-cast cementitious structure is schematically depicted. The system 100 may include a steam source 131, a carbon dioxide source 132, an ejector 110, and a curing chamber 120 downstream of the ejector. The ejector 110 may be operable to combine a lesser-pressure carbon dioxide containing stream 102 from the carbon dioxide source 132 with a greater-pressure steam 101 from the steam source 131 to produce a mixed stream 105. The mixed stream 105 may have a pressure greater than a pressure of the lesser-pressure carbon dioxide containing stream 102. The curing chamber 120 may be operable to receive the mixed stream 105 from the ejector 110 and contact the mixed stream 105 with a pre-cast cementitious structure during curing of the pre-cast cementitious structure.

The steam source 131 may be operable to produce greater-pressure steam 101. As used in the present disclosure, the term "steam" refers to water ($H_2O$) in the gas phase. That is, the steam source 131 may be any apparatus capable of generating greater-pressure steam 101, such as a boiler. As used in the present disclosure, the term "greater-pressure" may refer to a pressure greater than or equal to 150 kilopascals (kPa), and the term "lesser-pressure" may refer to a pressure less than 120 kPa. The greater-pressure steam 101 may have a pressure sufficient to produce a vacuum in the ejector 110, the vacuum being sufficient to suction the lesser-pressure carbon dioxide containing stream 102 into the ejector 110. The greater-pressure steam 101 may have a pressure sufficient to produce the mixed stream 105 having a pressure greater than the pressure of the lesser-pressure carbon dioxide containing stream 102. In some embodiments, the greater-pressure steam 101 may have a pressure of from 150 kPa to 2000 kPa, such as from 200 kPa to 2000 kPa, from 400 kPa to 2000 kPa, from 600 kPa to 2000 kPa, from 800 kPa to 2000 kPa, from 1000 kPa to 2000 kPa, from 1200 kPa to 2000 kPa, from 1400 kPa to 2000 kPa, from 1600 kPa to 2000 kPa, from 1800 kPa to 2000 kPa, from 150 kPa to 1800 kPa, from 150 kPa to 1600 kPa, from 150 kPa to 1400 kPa, from 150 kPa to 1200 kPa, from 150 kPa to 1000 kPa, from 150 kPa to 800 kPa, from 150 kPa to 600 kPa, from 150 kPa to 400 kPa, or from 150 kPa to 200 kPa.

The carbon dioxide source 132 may be operable to produce a lesser-pressure carbon dioxide containing stream 102. As used in the present disclosure, a "carbon dioxide containing stream" may refer to a stream that includes greater than 1 volume percent (vol. %) carbon dioxide based on the total volume flow rate of the stream, such as greater than 5 vol. %, greater than 10 vol. %, greater than 20 vol. %, greater than 30 vol. %, greater than 40 vol. %, greater than 50 vol. %, greater than 60 vol. %, greater than 70 vol. %, greater than 80 vol. %, greater than 90 vol. %, or greater than 99 vol. % based on the total volume flow rate of the stream. The lesser-pressure carbon dioxide containing stream 102 may have a pressure less than the pressure of the greater-pressure steam 101. In some embodiments, the lesser-pressure carbon dioxide containing stream 102 may have a pressure of less than or equal to 120 kPa, less than or equal to 110 kPa, less than or equal to 105 kPa, or less than or equal to 102 kPa. In some embodiments, the lesser-pressure carbon dioxide containing stream 102 may have a pressure of from 90 kPa to 120 kPa, such as from 90 kPa to 110 kPa, from 92 kPa to 110 kPa, from 94 kPa to 110 kPa, from 96 kPa to 110 kPa, from 98 kPa to 110 kPa, from 100 kPa to 110 kPa, from 102 kPa to 110 kPa, from 104 kPa to 110 kPa, from 106 kPa to 110 kPa, from 108 kPa to 110 kPa, from 90 kPa to 108 kPa, from 90 kPa to 106 kPa, from 90 kPa to 104 kPa, from 90 kPa to 102 kPa, from 90 kPa to 100 kPa, from 90 kPa to 98 kPa, from 90 kPa to 96 kPa, from 90 kPa to 94 kPa, or from 90 kPa to 92 kPa. In some embodiments, the lesser-pressure carbon dioxide containing stream 102 may be at atmospheric pressure.

The carbon dioxide source 132 may include a hydrocarbon combustion process. As a result, the lesser-pressure carbon dioxide containing stream 102 may include at least a portion of the combustion gases passed out of the hydrocarbon combustion process, the combustion gases including at least carbon dioxide. In addition to carbon dioxide, the combustion gases may also include, but are not limited to, one or more of carbon monoxide, oxygen, nitrogen, water vapor, unreacted hydrocarbons from the hydrocarbon fuel, sulfur compounds, nitrogen compounds, other compounds, or combinations of these. The lesser-pressure carbon dioxide containing stream 102 may comprise at least 1 weight percent (wt. %) combustion gases based on the total weight of the lesser-pressure carbon dioxide containing stream 102. In some embodiments, the lesser-pressure carbon dioxide containing stream 102 may include at least 5 vol. %, at least 10 vol. %, at least 20 vol. %, at least 30 vol. %, at least 40 vol. %, at least 50 vol. %, at least 60 vol. %, at least 70 vol. %, at least 80 vol. %, at least 90 vol. %, or at least 99 vol. % combustion gases based on the total weight of the lesser-pressure carbon dioxide containing stream 102. For example, the lesser-pressure carbon dioxide containing stream 102 may include a flue gas or combustion gas exhaust resulting from the combustion of hydrocarbons. The lesser-pressure carbon dioxide containing stream 102 may include one or a plurality of gas streams that contain carbon dioxide. In some embodiments, the lesser-pressure carbon dioxide containing stream 102 may be a combination of streams, at least one of which includes carbon dioxide. For example, the lesser-pressure carbon dioxide containing stream 102 may include carbon dioxide from a stream passed out of a synthesis gas (Syngas) de-acidification unit during regeneration of the Syngas de-acidification unit. Other sources of lesser-pressure carbon dioxide containing streams are contemplated.

The steam system 130 may be operable to produce both the greater-pressure steam 101 and the lesser-pressure carbon dioxide containing stream 102. The steam system 130 may comprise the steam source 131 and the carbon dioxide source 132. The steam system 130 may include a hydrocarbon combustion process operable to produce heat to generate the greater-pressure steam 101. The combustion gases resulting from combustion of a hydrocarbon fuel in the steam system 130 may be passed out of the steam system 130 as the lesser-pressure carbon dioxide containing stream 102. In some embodiments, the lesser-pressure carbon dioxide containing stream 102 may include at least a portion of the combustion gases produced from the combustion of the hydrocarbon fuel in the steam system 130. In some embodiments, the lesser-pressure carbon dioxide containing stream 102 may include at least 1% of the combustion gases, such as at least 5%, at least 10%, at least 20%, at least 30%, at least 40%, at least 50%, at least 60%, at least 70%, at least 80%, at least 90%, or at least 99% combustion gases produced from the combustion of the hydrocarbon fuel in the steam system 130.

Figure 2:
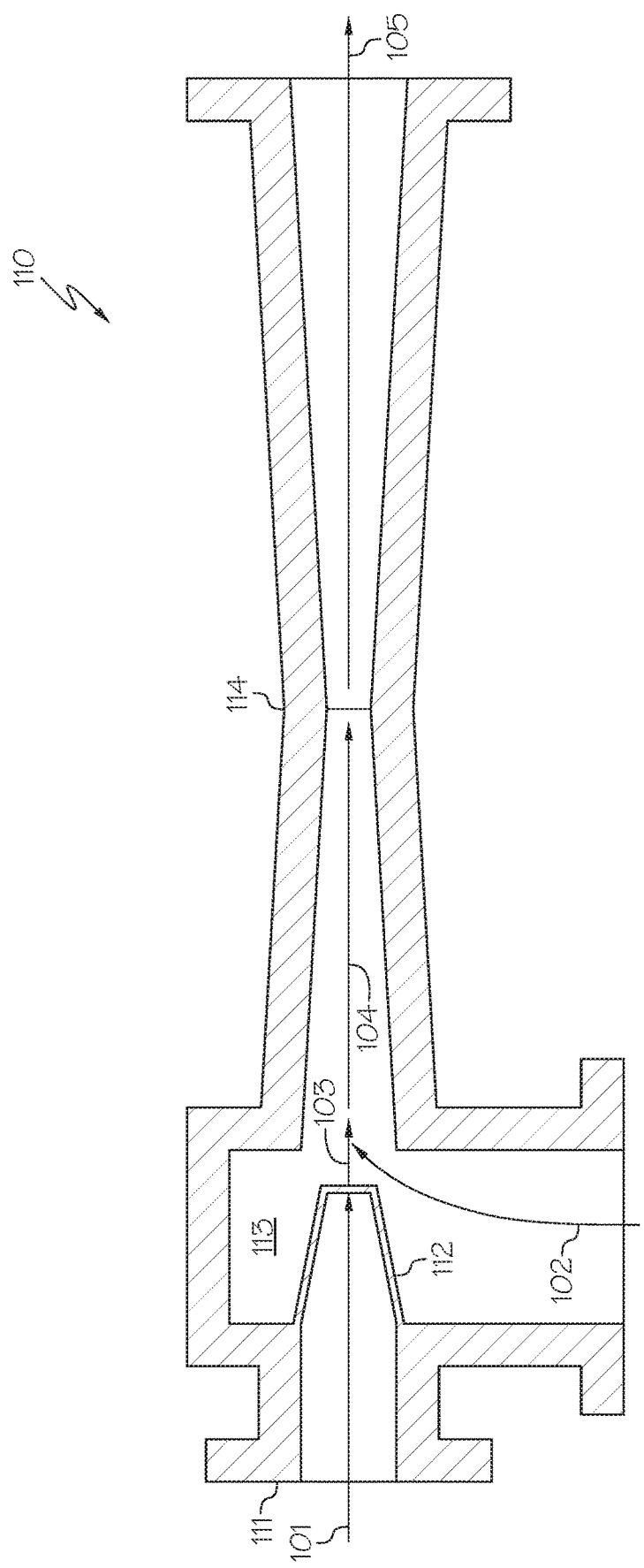
FIG. 2 schematically depicts an ejector of the system of FIG. 1 for accelerated carbonation curing of a pre-cast cementitious structure, according to one or more embodiments described in this disclosure.

Referring again to FIG. 1, the ejector 110 may be operable to combine the lesser-pressure carbon dioxide containing stream 102 from the carbon dioxide source 132 with the greater-pressure steam 101 from the steam source 131 to produce a mixed stream 105. Referring now to FIG. 2, the ejector 110 may include a steam inlet 111 in fluid communication with the steam source 131 (FIG. 1), a nozzle 112, a vacuum chamber 113 in fluid communication with the carbon dioxide source 132 (FIG. 1), and a diffuser 114. The greater-pressure steam 101 may be passed from the steam source 131, through the inlet 111, and to the nozzle 112. Referring still to FIG. 2, the pressure of the greater-pressure steam 101 may cause the greater-pressure steam 101 to pass through a convergent portion of the nozzle 112. The passing of the greater-pressure steam 101 through the convergent portion of the nozzle 112 may convert the pressure of the greater-pressure steam 101 into velocity to produce a greater-velocity steam 103. As used in the present disclosure, the term "greater-velocity" may refer to a gas velocity greater than the gas velocity of the greater-pressure steam 101 entering the ejector 110. As the greater-pressure steam 101 passes through the nozzle 112, the pressure decreases and the gas velocity increases.

The greater-velocity steam 103 may pass from the nozzle 112 into the internal volume of the vacuum chamber 113. The decrease in pressure and increase in velocity of the greater-velocity steam 103 at the outlet of the nozzle 112 may produce a vacuum within the internal volume of the vacuum chamber 113 through the Venturi effect. The vacuum may draw the lesser-pressure carbon dioxide containing stream 102 from the carbon dioxide source 132 into the vacuum chamber 113 and into the flow of the greater-velocity steam 103. The lesser-pressure carbon dioxide containing stream 102 may be combined with the greater-velocity steam 103 in the vacuum chamber 113 to produce a greater-velocity mixed stream 104.

The greater-velocity mixed stream 104 may pass from the vacuum chamber 113 to the diffuser 114. The diffuser 114 may include a convergent portion and a divergent portion. The passing of the greater-velocity mixed stream 104 through the diffuser 114 converts the increased velocity of the greater-velocity mixed stream 104 back into pressure to produce the mixed steam 105, which has a greater pressure and lesser gas velocity compared to the greater-velocity mixed stream 104. That is, passing the greater-velocity mixed stream 104 through the diffuser 114 may decrease the gas velocity and increase the pressure to produce the mixed stream 105. The mixed stream 105 may have a pressure greater than the pressure of the lesser-pressure carbon dioxide containing stream 102 and less than the pressure of the greater-pressure steam 101. The pressure of the mixed stream 105 may be sufficient to conduct the accelerated carbonation curing of the cementitious structures. In some embodiments, the mixed stream 105 may have a pressure of from 150 kPa to 1500 kPa, such as from 200 kPa to 1500 kPa, from 300 kPa to 1500 kPa, from 400 kPa to 1500 kPa, from 500 kPa to 1500 kPa, from 600 kPa to 1500 kPa, from 700 kPa to 1500 kPa, from 800 kPa to 1500 kPa, from 900 kPa to 1500 kPa, from 1000 kPa to 1500 kPa, from 1100 kPa to 1500 kPa, from 1200 kPa to 1500 kPa, from 1300 kPa to 1500 kPa, from 1400 kPa to 1500 kPa, from 150 kPa to 1400 kPa, from 150 kPa to 1300 kPa, from 150 kPa to 1200 kPa, from 150 kPa to 1100 kPa, from 150 kPa to 1000 kPa, from 150 kPa to 900 kPa, from 150 kPa to 800 kPa, from 150 kPa to 700 kPa, from 150 kPa to 600 kPa, from 150 kPa to 500 kPa, from 150 kPa to 400 kPa, from 150 kPa to 300 kPa, or from 150 kPa to 200 kPa.

The mixed stream 105 may contain at least a portion of the carbon dioxide from the lesser-pressure carbon dioxide containing stream 102. The mixed stream 105 may include a concentration of carbon dioxide sufficient to conduct the accelerated carbonation curing of the cementitious structures. As such, the mixed stream 105 may contain from 1 vol. % to 50 vol. % carbon dioxide based on the total volume flow rate of the mixed stream 105, such as from 2.5 vol. % to 50 vol. %, from 5 vol. % to 50 vol. %, from 10 vol. % to 50 vol. %, from 15 vol. % to 50 vol. %, from 20 vol. % to 50 vol. %, from 25 vol. % to 50 vol. %, from 30 vol. % to 50 vol. %, from 35 vol. % to 50 vol. %, from 40 vol. % to 50 vol. %, from 45 vol. % to 50 vol. %, from 1 vol. % to 45 vol. %, from 1 vol. % to 40 vol. %, from 1 vol. % to 35 vol. %, from 1 vol. % to 30 vol. %, from 1 vol. % to 25 vol. %, from 1 vol. % to 20 vol. %, from 1 vol. % to 15 vol. %, from 1 vol. % to 10 vol. %, from 1 vol. % to 5 vol. %, or from 1 vol. % to 2.5 vol. % carbon dioxide based on the total volume flow rate of the mixed stream 105. A reduced carbon dioxide content in the mixed stream 105 of less than 1 vol. % may result in reduced carbonation of the pre-cast cementitious structure. A carbon dioxide concentration in the mixed stream 105 greater than 50 vol. % may result in an amount of steam present in the mixed stream 105 that is not sufficient to conduct curing of the cementitious structures. The mixed stream 105 may also include the steam from the greater-pressure steam 101 passed into the ejector 110 as well as other gases from the lesser-pressure carbon containing stream 102.

Referring again to FIG. 1, the mixed stream 105 may be passed from the ejector 110 to the curing chamber 120. The curing chamber 120 may enclose the pre-cast cementitious structures within an internal volume of the curing chamber 120. The internal volume of the curing chamber 120 may be a volume defined by at least one sidewall, a floor, and a roof of the curing chamber 120. The curing chamber 120 may be operable to receive the mixed stream 105 within the internal volume and contact the mixed stream 105 with the pre-cast cementitious structures during curing. The mixed stream 105 may be contacted with the pre-cast cementitious structures for a contact time sufficient to cure the pre-cast cementitious structures. The mixed stream 105 may be contacted with the pre-cast cementitious structure for contact time of from 1 hour to 8 hours. In some embodiments, the mixed stream 105 may be contacted with the pre-cast cementitious structures for a contact time of from 2 hours to 8 hours, from 3 hours to 8 hours, from 4 hours to 8 hours, from 5 hours to 8 hours, from 6 hours to 8 hours, from 7 hours to 8 hours, from 1 hour to 7 hours, from 1 hour to 6 hours, from 1 hour to 5 hours, from 1 hour to 4 hours, from 1 hour to 3 hours, or from 1 hour to 2 hours.

The conditions within the internal volume of the curing chamber 120 may also be controlled such that the conditions are sufficient for accelerated carbonation curing. For example, the temperature of the internal volume of the curing chamber 120 may be from 40° C. to 80° C. In some embodiments, the temperature of the internal volume of the curing chamber 120 may be from 50° C. to 80° C., from 60° C. to 80° C., from 70° C. to 80° C., from 40° C. to 70° C., from 40° C. to 60° C., from 40° C. to 50° C., or from 50° C. to 60° C. The relative humidity of the internal volume of the curing chamber 120 may also be controlled. As used in the present disclosure, the term "relative humidity" may refer to the amount of water vapor present in the air expressed as a percentage (%) of the amount of water vapor needed for saturation at the same temperature. For example, the relative humidity of the internal volume of the curing chamber 120 may be from 40% to 80%. In some embodiments, the relative humidity of the internal volume of the curing chamber 120 may be from 50% to 80%, from 60% to 80%, from 70% to 80%, from 40% to 70%, from 40% to 60%, from 40% to 50%, or from 50% to 60%.

Pre-cast cementitious structures may include molded cementitious compositions. The cementitious compositions may include at least a cement binder, an aggregate, and water. The cement binder may include, but is not limited to, one or more than one of tricalcium silicate ($Ca_3SiO_5$ or $3CaO.SiO_2$), dicalcium silicate ($Ca_2SiO_4$ or $2CaO.SiO_2$), tricalcium aluminate ($Ca_3Al_2O_6$ or $3CaO.Al_2O_3.Fe_2O_3$), tetracalcium aluminoferrite ($Ca_4Al_2Fe_2O_{10}$ or $4CaO.Al_2O_3.Fe_2O_3$), gypsum ($CaSO_4.2H_2O$), other cement binders, or combinations of these. The aggregate may include chemically inert and solid bodies having various shapes and sizes. As used in the present disclosure, the term "chemically inert" may refer to substances that have a sufficiently great energy barrier to reactions with other substances such that it is practically inactive with respect to chemical reactions. The aggregate may have various shapes and sizes, and may be made from various materials ranging from fine particles of sand to large, course rocks. The aggregate may include ultra-light aggregate, light weight aggregate, normal weight aggregate, and heavyweight aggregate. Ultra-light weight aggregate may include, but is not limited to, vermiculite, ceramics spheres and perlite. Light weight aggregate may include, but is not limited to, expanded clay, shale or slate, or crushed brick. Normal weight aggregate may include, but is not limited to, crushed limestone, sand, river gravel, or crushed concrete. Heavyweight aggregate may include, but is not limited to steel or iron shot, or steel or iron pellets. The water in the cementitious composition may include water from any suitable source, such as but not limited to municipal water, ground water, treated or untreated salt water, treated wastewater, treated produced water, well water, or other source of water. The cementitious composition may also include other additives, such as polymers, colorants, detergents, retardants, accelerants, minerals, other additives, or combinations of these.

Pre-cast cementitious structures may be placed within the curing chamber 120 for curing. In some embodiments, the pre-cast cementitious structures may be placed within a mold positioned within the curing chamber 120. In some embodiments, the pre-cast cementitious structures may include one or more than one reinforcing members, such as steel rods, or one or more than one fittings, such as eye bolts, threaded bolts, brackets, or other fittings.

During curing within the internal volume of the curing chamber 120, water vapor (steam) in the mixed stream 105 may react with the compounds in the cementitious composition of the pre-cast cementitious structures present within the curing chamber 120. In particular, water vapor in the mixed stream 105 may hydrate calcium silicates within the pre-cast cementitious structures. The mixed stream 105 may diffuse into the pores of the pre-cast cementitious structures. Once in the pores, the water vapor in the mixed stream 105 may condense into a liquid within the pores of the pre-cast cementitious structures, and the liquid water may hydrate the calcium silicates. Without being bound by any particular theory, it is believed that the hydration of the calcium silicates, tricalcium silicate and dicalcium silicate, within the pre-cast cementitious structures may result in an increase in the mechanical strength of the pre-cast cementitious structures. The hydration of tricalcium silicate occurs via the following chemical reaction 1 (RXN 1):

$$2Ca_3SiO_5(s)+7H_2O(l) \rightarrow 3CaO.2SiO_2.4H_2O(s)+3Ca(OH)_2(s) \quad \text{RXN 1}$$

The hydration of dicalcium silicate occurs via the following chemical reaction 2 (RXN 2):

$$2Ca_2SiO_4(s)+5H_2O(l) \rightarrow 3CaO.2SiO_2.4H_2O(s)+Ca(OH)_2(s) \quad \text{RXN 2}$$

During curing within the curing chamber 120, the carbon dioxide within the mixed stream 105 may react with the calcium silicates within the pre-cast cementitious structures to form calcium carbonate. In particular, the mixed stream 105 may diffuse into the pores of the pre-cast cementitious structures, and gaseous carbon dioxide within the mixed stream 105 may solvate in the liquid water condensed in the pores to form aqueous carbon dioxide. Aqueous carbon dioxide may hydrate to form carbonic acid ($H_2CO_3$) within the pre-cast cementitious structures. The carbonic acid may ionize to form $H^{1+}$, $HCO_3^{1-}$, and $CO_3^{2-}$ ions. As a result of formation of $H^+$ ions within the pre-cast cementitious structures, the pH of the pre-cast cementitious structures may decrease, resulting in dissolution of the calcium silicates present within the pre-cast cementitious structures to form $Ca^{2+}$ and $SiO_4^{4-}$ ions. The $Ca^{2+}$ ions may react with the $CO_3^{2-}$ ions to form calcium carbonate ($CaCO_3$). The overall reaction of carbon dioxide from the mixed stream 105 with tricalcium silicate is provided in the following chemical reaction 3 (RXN 3):

$$2Ca_3SiO_5(s)+3CO_2(g)+4H_2O(l) \rightarrow 3CaO.2SiO_2.4H_2O(s)+3CaCO_3(s) \quad \text{RXN 3}$$

The overall reaction of $CO_2$ within the mixed stream 105 with dicalcium silicate is provided in the following chemical reaction 4 (RXN 4):

$$4Ca_2SiO_2(s)+2CO_2(g)+8H_2O(l) \rightarrow 2(3CaO.2SiO_2.4H_2O)(s)+2CaCO_3(s) \quad \text{RXN 4}$$

Additionally, carbon dioxide from the mixed stream 105 may react with the calcium hydroxide formed by the hydration of calcium silicates in the pores of the pre-cast cementitious structures, such as those formed via chemical reactions 1 and 2, forming calcium carbonate. The overall reaction of carbon dioxide with calcium hydroxide is provided in the following chemical reaction 5 (RXN 5):

$$Ca(OH)_2(s)+CO_2(g) \rightarrow CaCO_3(s)+H_2O(l) \quad \text{RXN 5}$$

Without being bound by any particular theory, it is believed that the formation of both calcium hydroxide and calcium carbonate within the pores of the pre-cast cementitious structures may increase the strength of the pre-cast cementitious structures after curing. Also, due to reaction of carbon dioxide from the mixed stream 105 with calcium hydroxide to form calcium carbonate within the pores of the pre-cast cementitious structure, excess carbon dioxide may be sequestered within the pre-cast cementitious structure, reducing the carbon dioxide emissions of the curing process. Further, the amount of calcium hydroxide formed during early stages of curing may be regulated such that the heat of hydration within the pre-cast cementitious structure is reduced compared to curing without carbon dioxide. The reduced heat of hydration within the pre-cast cementitious structure may result in less thermal expansion of the structure during early stages of curing and a reduction in microcracks formed the final pre-cast cementitious structure. This reduction of microcracks within the final pre-cast cementitious structure may also result in an increase in strength for the final cementitious structure.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims and their equivalents.

In a first aspect of the present disclosure, a system for accelerated carbonation curing of a pre-cast cementitious structure includes an ejector and a curing chamber downstream of the ejector. The ejector is operable to combine a lesser-pressure carbon dioxide containing stream from a carbon dioxide source with a greater-pressure steam to produce a mixed stream including at least steam and carbon dioxide. The mixed stream has a pressure greater than the pressure of the lesser-pressure carbon dioxide containing stream. The curing chamber is operable to receive the mixed stream from the ejector and contact the mixed stream with the pre-cast cementitious structure during curing of the pre-cast cementitious structure.

In a second aspect of the present disclosure, a system for accelerated carbonation curing of a pre-cast cementitious structure includes a carbon dioxide source, a steam source, an ejector, and a curing chamber downstream of the ejector. The carbon dioxide source is operable to produce a lesser-pressure carbon dioxide containing stream. The steam source is operable to produce greater-pressure steam. The ejector is operable to combine the greater-pressure steam with the lesser-pressure carbon dioxide containing stream to produce a mixed stream including at least steam and carbon dioxide. The mixed stream has a pressure greater than a pressure of the lesser-pressure carbon dioxide containing stream. The curing chamber is operable to receive the mixed stream from the ejector and contact the mixed stream with the pre-cast cementitious structure during curing of the pre-cast cementitious structure.

A third aspect of the present disclosure may include either of the first or second aspects, in which the lesser-pressure carbon dioxide containing stream has a pressure of from 90 kilopascals (kPa) to 110 kPa.

A fourth aspect of the present disclosure may include any of the first through third aspects in which the greater-pressure steam has a pressure of from 150 kPa to 2000 kPa.

A fifth aspect of the present disclosure may include any of the first through fourth aspects in which the mixed stream has a pressure of from 150 kPa to 1500 kPa.

A sixth aspect of the present disclosure may include any of the first through fifth aspects in which the mixed stream contains from 1 volume percent (vol. %) to 50 vol. % carbon dioxide based on the total volume flow rate of the mixed stream.

A seventh aspect of the present disclosure may include any of the first through sixth aspects in which the carbon dioxide source comprises a hydrocarbon combustion process and the lesser-pressure carbon dioxide containing stream contains at least a portion of combustion gases from the hydrocarbon combustion process.

An eighth aspect of the present disclosure may include the seventh aspect in which the greater-pressure steam is produced by the steam source, the steam source including a steam system operable to produce the greater-pressure steam through combustion of a hydrocarbon fuel.

A ninth aspect of the present disclosure may include the eighth aspect in which the carbon dioxide source includes at least a portion of combustion gases from combustion of the hydrocarbon fuel in the steam system.

A tenth aspect of the present disclosure may include any of the first through ninth aspects in which the ejector includes an inlet in fluid communication with the steam source, a nozzle, a vacuum chamber in fluid communication with the carbon dioxide source, and a diffuser.

In an eleventh aspect of the present disclosure, a process for accelerated carbonation curing of a pre-cast cementitious structure includes producing a greater-pressure steam. The process also includes passing the greater-pressure steam through an ejector having a vacuum chamber in fluid communication with a carbon dioxide source to receive a lesser-pressure carbon dioxide containing stream. The lesser-pressure carbon dioxide containing stream has a pressure less than a pressure of the greater-pressure steam. Passing the greater-pressure steam through the ejector combines the lesser-pressure carbon dioxide containing stream with the greater-pressure steam to produce a mixed stream including at least steam and carbon dioxide. The mixed stream has a pressure greater than the pressure of the lesser-pressure carbon dioxide containing stream. The process also includes contacting the mixed stream with a pre-cast cementitious structure to conduct the accelerated carbonation curing of the pre-cast cementitious structure.

A twelfth aspect of the present disclosure may include the eleventh aspect in which the lesser-pressure carbon dioxide containing stream has a pressure of from 90 kPa to 110 kPa.

A thirteenth aspect of the present disclosure may include either of the eleventh or twelfth aspects in which the greater-pressure steam has a pressure of from 150 kPa to 2000 kPa.

A fourteenth aspect of the present disclosure may include any of the eleventh through thirteenth aspects in which the mixed stream has a pressure of from 150 kPa to 1500 kPa.

A fifteenth aspect of the present disclosure may include any of the eleventh through fourteenth aspects in which the mixed stream contains from 1 vol. % to 50 vol. % carbon dioxide based on the total volume flow rate of the mixed stream.

A sixteenth aspect of the present disclosure may include any of the eleventh through fifteenth aspects including contacting the mixed stream with the pre-cast cementitious structure for from 1 hour to 8 hours.

A seventeenth aspect of the present disclosure may include any of the eleventh through sixteenth aspects including passing the mixed stream to a curing chamber downstream of the ejector and contacting the mixed stream with the pre-cast cementitious structure within the curing chamber.

It should now be understood that various aspects of the systems and processes for accelerated carbonation curing of a pre-cast cementitious structure are described and such aspects may be utilized in conjunction with various other aspects.

Throughout this disclosure ranges are provided for various processing parameters and operating conditions for the systems and methods of desalinating aqueous streams and compositions of various streams and mixtures. It will be appreciated that when one or more explicit ranges are provided the individual values and the sub-ranges formed within the range are also intended to be provided as providing an explicit listing of all possible combinations is prohibitive. For example, a provided range of 1-10 also includes the individual values, such as 1, 2, 3, 4.2, and 6.8, as well as all the ranges that may be formed within the provided bounds, such as 1-8, 2-4, 6-9, and 1.3-5.6.

It should be apparent to those skilled in the art that various modifications and variations can be made to the described embodiments without departing from the spirit and scope of the claimed subject matter. Thus, it is intended that the specification cover the modifications and variations of the various described embodiments provided such modification and variations come within the scope of the appended claims and their equivalents.

What is claimed is:

1. A system for accelerated carbonation curing of a pre-cast cementitious structure, the system comprising:
    an ejector operable to combine a lesser-pressure carbon dioxide containing stream from a carbon dioxide source with a greater-pressure steam to produce a mixed stream comprising at least steam and carbon dioxide and having a pressure greater than a pressure of the lesser-pressure carbon dioxide containing stream; and
    a curing chamber downstream of the ejector, the curing chamber operable to receive the mixed stream from the ejector and contact the mixed stream with the pre-cast cementitious structure during curing of the pre-cast cementitious structure; where
        the ejector comprises an inlet in fluid communication with a steam source, a nozzle in fluid communication with the inlet, a vacuum chamber in fluid communication with the carbon dioxide source, and a diffuser;
        the nozzle is operable to convert the greater-pressure steam into a greater-velocity steam which produces a vacuum in the vacuum chamber; and
        the vacuum is operable to draw the lesser-pressure carbon dioxide containing stream into the vacuum chamber and thereby causes mixing of the greater-velocity steam and the lesser-pressure carbon dioxide containing stream.

2. The system of claim 1, in which the lesser-pressure carbon dioxide containing stream has a pressure of from 90 kilopascals (kPa) to 110 kPa.

3. The system of claim 1, in which the greater-pressure steam has a pressure of from 150 kPa to 2000 kPa.

4. The system of claim 1, in which the mixed stream has a pressure of from 150 kPa to 1500 kPa.

5. The system of claim 1, in which the mixed stream comprises from 1 volume percent (vol. %) to 50 vol. % carbon dioxide based on the total volume flow rate of the mixed stream.

6. The system of claim 1, further comprising the carbon dioxide source, wherein the carbon dioxide source comprises a hydrocarbon combustion process and the lesser-pressure carbon dioxide containing stream comprises at least a portion of combustion gases from the hydrocarbon combustion process.

7. The system of claim 1, further comprising the steam source fluidly coupled to the ejector, the steam source comprising a steam system operable to produce the greater-pressure steam through combustion of a hydrocarbon fuel.

8. The system of claim 7, wherein the lesser-pressure carbon dioxide containing stream comprises at least a portion of combustion gases resulting from the combustion of the hydrocarbon fuel in the steam system.

9. A process for accelerated carbonation curing of a pre-cast cementitious structure, the process comprising:
producing a greater-pressure steam,
passing the greater-pressure steam through an ejector having a nozzle and a vacuum chamber in fluid communication with a carbon dioxide source to receive a lesser-pressure carbon dioxide containing stream, the lesser-pressure carbon dioxide containing stream having a pressure less than a pressure of the greater-pressure steam, where passing the greater-pressure steam through the ejector combines the lesser-pressure carbon dioxide containing stream with the greater-pressure steam to produce a mixed stream comprising at least steam and carbon dioxide and having a pressure greater than a pressure of the lesser-pressure carbon dioxide containing stream; and
contacting the mixed stream with a pre-cast cementitious structure to conduct the accelerated carbonation curing of the pre-cast cementitious structure; where
the nozzle is configured to convert the greater-pressure steam into a greater-velocity steam which produces a vacuum in the vacuum chamber; and
the vacuum is configured to draw the lesser-pressure carbon dioxide containing stream into the vacuum chamber and thereby causes mixing of the greater-velocity steam and the lesser-pressure carbon dioxide containing stream.

10. The process of claim 9, in which the lesser-pressure carbon dioxide containing stream has a pressure of from 90 kPa to 110 kPa.

11. The process of claim 9, in which the greater-pressure steam has a pressure of from 150 kPa to 2000 kPa.

12. The process of claim 9, in which the mixed stream has a pressure of from 150 kPa to 1500 kPa.

13. The process of claim 9, in which the mixed stream comprises from 1 vol. % to 50 vol. % carbon dioxide based on the total volume flow rate of the mixed stream.

14. The process of claim 9, comprising contacting the mixed stream with the pre-cast cementitious structure for from 1 hour to 8 hours.

15. The process of claim 9, comprising passing the mixed stream to a curing chamber downstream of the ejector and contacting the mixed stream with the pre-cast cementitious structure within the curing chamber.

16. The process of claim 9, further comprising passing the greater-pressure steam from a steam source to the ejector, wherein the steam source comprises a steam system configured to produce the greater-pressure steam through combustion of a hydrocarbon fuel.

17. The process of claim 16, wherein the lesser-pressure carbon dioxide containing stream comprises at least a portion of combustion gases resulting from the combustion of the hydrocarbon fuel in the steam system.

18. A system for accelerated carbonation curing of a pre-cast cementitious structure, the system comprising:
an ejector comprising a nozzle operable to convert a greater-pressure steam into a greater velocity steam which produces a vacuum, where the vacuum draws a lesser-pressure carbon dioxide containing stream from a carbon dioxide source into the greater velocity steam to produce a mixed stream comprising at least steam and carbon dioxide and having a pressure greater than a pressure of the lesser-pressure carbon dioxide containing stream; and
a curing chamber downstream of the ejector, the curing chamber operable to receive the mixed stream from the ejector and contact the mixed stream with the pre-cast cementitious structure during curing of the pre-cast cementitious structure.

19. The system of claim 18, wherein the ejector further comprises a vacuum chamber in fluid communication with the carbon dioxide source and a diffuser.

20. The system of claim 18, wherein the ejector comprises an inlet in fluid communication with a steam source.

* * * * *